(12) United States Patent
Drew

(10) Patent No.: US 11,614,147 B1
(45) Date of Patent: Mar. 28, 2023

(54) GEAR SYSTEMS

(71) Applicant: Christopher Drew, Dickinson, TX (US)

(72) Inventor: Christopher Drew, Dickinson, TX (US)

(73) Assignee: Christopher Drew, Dickinson, TX (US)

( * ) Notice: Subject to any disclaimer, the term of this patent is extended or adjusted under 35 U.S.C. 154(b) by 0 days.

(21) Appl. No.: 17/743,322

(22) Filed: May 12, 2022

(51) Int. Cl.
*F16H 1/46* (2006.01)
*F16H 1/28* (2006.01)

(52) U.S. Cl.
CPC ......... *F16H 1/46* (2013.01); *F16H 2001/289* (2013.01)

(58) Field of Classification Search
CPC ............. F16H 1/46; F16H 3/366; F16H 3/426
USPC ......................................................... 475/248
See application file for complete search history.

(56) References Cited

U.S. PATENT DOCUMENTS

| | | | | |
|---|---|---|---|---|
| 2,313,183 A * | 3/1943 | Trbojevich | ................ | F16H 1/46 475/273 |
| 4,869,139 A * | 9/1989 | Gotman | ................ | B25B 21/008 475/263 |
| 6,183,388 B1 * | 2/2001 | Hawkins | .................... | F16H 1/36 74/416 |
| 7,713,158 B2 * | 5/2010 | Gassmann | ........... | B60K 17/346 475/213 |
| 8,068,766 B2 * | 11/2011 | Uehara | ................ | G03G 15/757 399/167 |
| 8,506,440 B2 * | 8/2013 | Krude | ..................... | F16H 48/10 475/230 |
| 10,215,278 B1 * | 2/2019 | Tuchscherer | ......... | F16H 63/304 |
| 10,274,048 B2 | 4/2019 | Drew | | |

* cited by examiner

*Primary Examiner* — Derek D Knight
(74) *Attorney, Agent, or Firm* — Patterson + Sheridan, LLP

(57) ABSTRACT

The present disclosure relates to gear systems. In at least one embodiment, a gear system includes a first shaft disposed through an orifice of a first gear. The first gear has a first surface and a second surface disposed opposite the first surface, and the second surface has a plurality of teeth. The gear system includes a second gear having a first surface and a second surface disposed opposite the first surface, and the first surface has a plurality of teeth. The gear system has a carrier connected to the first shaft at the first surface of the carrier. The gear system has a plurality of planetary gears connected to the carrier. The gear system includes a bracket connected to the first gear at the first end of the bracket. The first shaft and the second shaft rotate on an axis.

19 Claims, 3 Drawing Sheets

GEAR SYSTEMS

FIELD

The present disclosure relates to gear systems.

BACKGROUND

Many devices, such as motor vehicles, utilize gears to provide rotational output and power to a device. Some desired applications require a higher output power than a device can provide. Alternatively, a sufficient output power is provided, but lower input power would be beneficial for energy savings.

Conventional systems utilizing gears are typically epicyclic gear systems. Devices utilizing such gear systems are limited in use of planetary gears which use high input speeds and function with a higher loss of torque. Such devices fail to provide a gear system that increases the output speed of, for example, a motor and fail to provide a reduced loss of torque. Torque is proportional to the gear ratio of the system. Conventional gear systems that produce an increase in rotational output speed reduce torque output by the same ratio. For example, if a conventional gear system that has a gear ratio of 1:2, the output speed is twice the input speed but the output torque is half the input torque.

Some compound gear trains have been explored, but such gear systems typically are too large (both in height and width) for suitable application in a particular device. For example, a conventional gear system can have a series of stacked plates starting from a wide stationary base plate with a series of plates stacked on top of the base plate, each having a narrower diameter than the stationary base plate.

There is a need for improved gear systems for increasing the output speed of a motor with reduced loss of torque and reduced amount of material and space used, as compared to conventional gear systems.

SUMMARY

The present disclosure relates to gear systems.

In at least one embodiment, a gear system includes a first shaft disposed through an orifice of a first gear. The first gear has a first surface and a second surface disposed opposite the first surface, and the second surface has a plurality of teeth. The gear system includes a second gear having a first surface and a second surface disposed opposite the first surface, and the first surface has a plurality of teeth. The gear system has a carrier having a first surface and a second surface. The carrier is connected to the first shaft at the first surface of the carrier. The gear system has a plurality of planetary gears connected to the carrier. The planetary gears each include a plurality of teeth configured to engage with the plurality of teeth of the second surface of the first gear and the plurality of teeth of the first surface of the second gear. The carrier and the plurality of planetary gears are each disposed between the first gear and the second gear. The gear system includes a bracket having a first end and a second end. The bracket is connected to the first gear at the first end of the bracket. The gear system includes a second shaft having a first end and second end. The second shaft is connected at the first end of the second shaft to the second gear at the second surface of the second gear. The first shaft and the second shaft rotate on an axis. The first shaft rotates in the same direction as the second shaft. The rotational speed of the first shaft is different than the rotational speed of the second shaft.

BRIEF DESCRIPTION OF THE FIGURES

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

Figure 1:
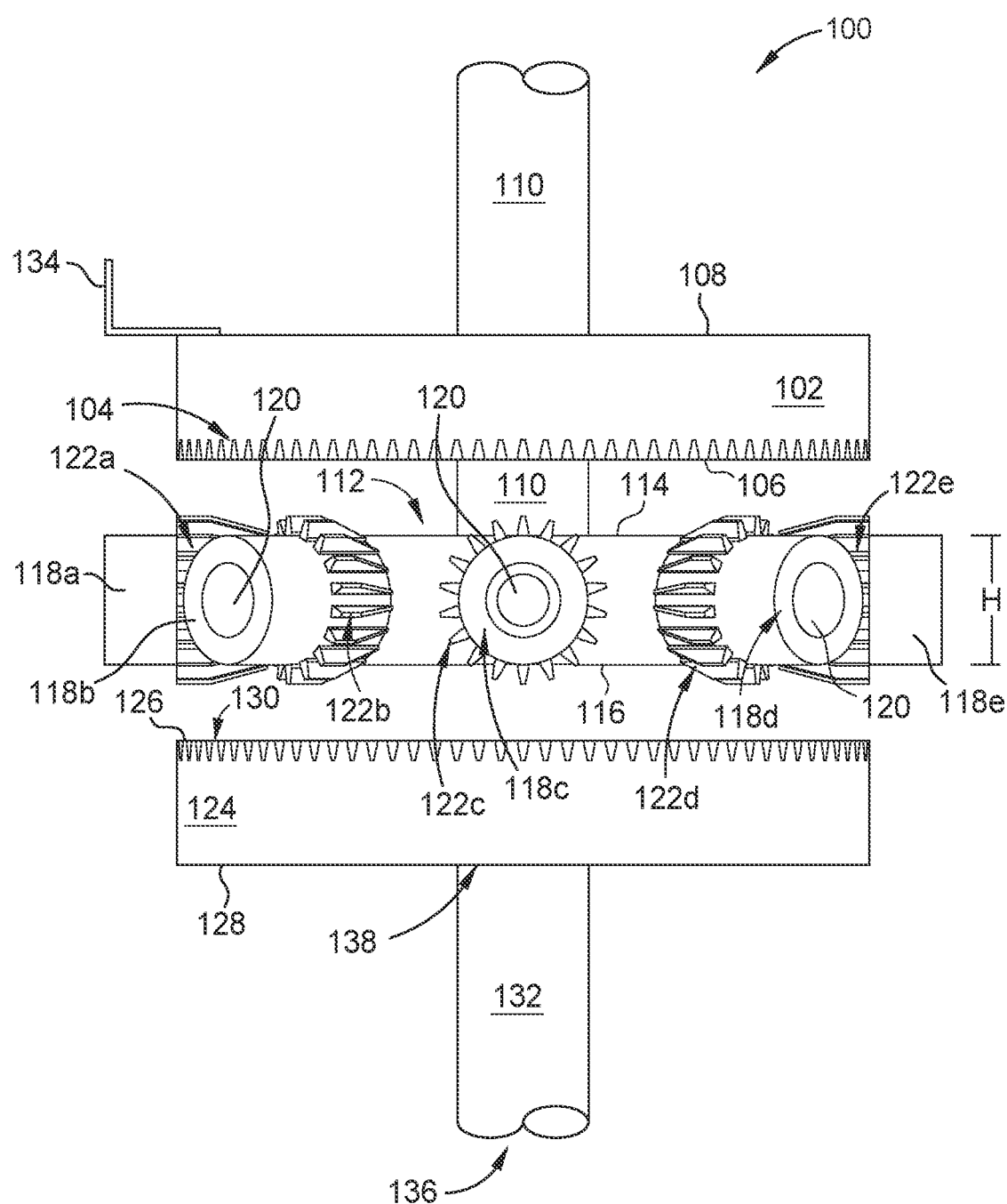
FIG. 1 is an exploded side view of a gear system.

To facilitate understanding, identical reference numerals have been used, where possible, to designate identical elements that are common to the figures. The figures are not drawn to scale and may be simplified for clarity. It is contemplated that elements and features of one aspect may be beneficially incorporated in other aspects without further recitation.

DETAILED DESCRIPTION

The present disclosure relates to gear systems. More specifically, the present disclosure provides gear systems for increasing the rotational output speed of a shaft with a reduced loss of torque. It has been discovered that gear systems of the present disclosure can provide rotational speed of an output shaft of the gear systems to be twice the rotational speed of an input shaft of the gear systems with reduced loss of torque compared to conventional gear systems. Gear systems of the present disclosure also provide smaller gear systems as compared to conventional gear systems.

In some embodiments, a gear system includes a first shaft disposed through an orifice of a first gear. The first gear has a first surface and a second surface disposed opposite the first surface, and the second surface has a plurality of teeth. The gear system includes a second gear having a first surface and a second surface disposed opposite the first surface, and the first surface has a plurality of teeth. The gear system has a carrier having a first surface and a second surface. The carrier is connected to the first shaft at the first surface of the carrier. The gear system has a plurality of planetary gears connected to the carrier. The planetary gears each include a plurality of teeth configured to engage with the plurality of teeth of the second surface of the first gear and the plurality of teeth of the first surface of the second gear. The carrier and the plurality of planetary gears are each disposed between the first gear and the second gear. The gear system includes a bracket having a first end and a second end. The bracket is connected to the first gear at the first end of the bracket and is connected to a stationary housing at the second end of the bracket. The gear system includes a second shaft having a first end and second end. The second shaft is connected at the first end of the second shaft to the second gear at the second surface of the second gear. The first shaft and the second shaft rotate on an axis. The first shaft rotates in the same direction as the second shaft. The rotational speed of the first shaft is different than the rotational speed of the second shaft.

FIG. 1 is a side view of a gear system 100. Gear system 100 is a gear system having a shaft 110 that extends through an orifice of a first gear 102. Shaft 110 is not connected to first gear 102. Shaft 110 is connected to a carrier 112 at a first surface 114 of carrier 112. Carrier 112 is connected to a plurality of planetary gears 118a, 118b, 118c, 118d, and 118e via a plurality of fasteners 120. The planetary gears 118a, 118b, 118c, 118d, and 118e are disposed at the perimeter of the carrier 112 and arranged at predetermined angular distances from one another. The planetary gears 118a, 118b, 118c, 118d, and 118e are arranged in a plane of the carrier 112. Each fastener 120 has a length traversing a length of its respective planetary gear and is disposed into carrier 112 at an angle that is substantially perpendicular to a height (H) of carrier 112, e.g., perpendicular to a longitudinal axis of the shaft 110, such that the teeth of each respective planetary gear are arranged radially about each respective carrier fasteners 120. Height (H) is defined by a distance between first surface 114 and second surface 116 of carrier 112. Planetary gear 118a has a plurality of teeth 122a. Planetary gear 118b has a plurality of teeth 122b. Planetary gear 118c has a plurality of teeth 122c. Planetary gear 118d has a plurality of teeth 122d. Planetary gear 118e has a plurality of teeth 122e. Additional planetary gears (not shown), each having a plurality of teeth (not shown), are disposed around the carrier 112. The number of planetary gears, the size, and total number of teeth can vary. In order to calculate a gear ratio of 1:1, the total number of teeth on the planetary gears should match the number of teeth on the first gear (but not required). The first gear and second gear must have the same number of teeth in order to calculate a gear ratio of 1:1. Calculations differ based on what is being measured (i.e., speed, torque, rpm, velocity, tangent force) and the calculation method used. When using gears, tooth design allows teeth to mush together to transmit motion.

The number of planetary gears 118a-118e connected to the carrier 112 can be one, two, three, four, five, six, seven, or more. Planetary gears 118a-118e are equal in dimension and number of teeth 122a-122e. The sum total of teeth 122a-122e is about equal to the total number of teeth on the first gear 102. The total number of teeth on the first gear 102 is about equal to the total number of teeth on the second gear 124. Gear ratio is calculated by the total number of teeth on the second gear 124 divided by the sum total number of teeth on planetary gears 118a-118e. For example, if the total number of teeth on the second gear 124 is 60 and the sum total number of teeth on the planetary gears 118a-118e is 60, then the gear ratio is 60:60 or 1:1.

Teeth 122a, 122b, 122c, 122d, and 122e are configured to engage a plurality of teeth 104 disposed on a second surface 106 of first gear 102. Second surface 106 is disposed opposite first surface 108 of first gear 102. First gear 102 is connected (e.g., at first surface 108) to a housing, such as a transmission housing, (not shown) via a bracket 134. Bracket 134 connected to housing holds first gear static while shaft 110 (e.g., an engine crank shaft) rotates through the orifice of first gear 102. The space between the shaft and gear can vary. Bearings are not necessary but could be used for stability of the shaft and gear. In some embodiments, housing (not shown) can be a static component of an interior portion of an automobile. Rotating shaft 110 provides rotational input to carrier 112 and ultimately planetary gears 118a-118e. Conventional gear trains lose more than 50% of torque when used to double the output speed. In gear systems, speed and torque increase/decrease is calculated by the gear ratio—Number of teeth on the output gear divided by the number of teeth on the input gear. Speed is measured in RPM and torque is measured in foot-pounds or inch-pounds. Planetary gears 118a-118e are also configured to engage second gear 124 via a plurality of teeth 130 at first surface 126 of second gear 124. Carrier 112 is not coupled directly with second gear 124 (e.g., via a shaft). Instead, the planetary gears 118a, 118b, 118c, 118d, and 118e are a source of contact or engagement (e.g., the sole source of contact) to second gear 124 at first surface 126. As shown in FIG. 1, first gear 102 has an outer surface corresponding to an outer diameter of first gear 102 such that the outer surface (sidewall) is substantially smooth (e.g., does not have teeth). Second gear 124 has an outer surface (sidewall) corresponding to an outer diameter of second gear 124 such that the outer surface is substantially smooth (e.g., does not have teeth).

Figure 2:
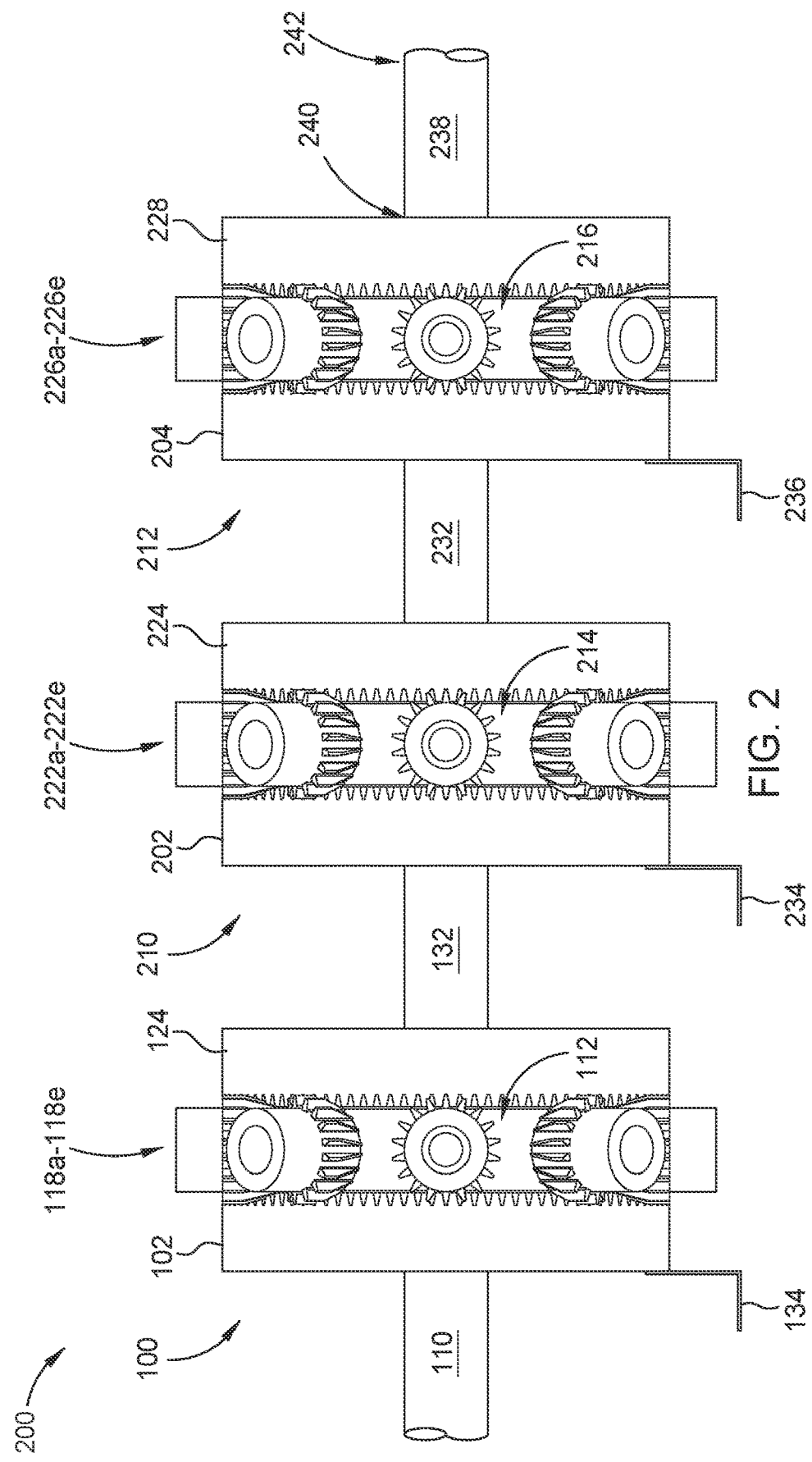
FIG. 2 is a side view of a system having a plurality of gear systems.

First surface 126 is disposed opposite second surface 128 of second gear 124. A second shaft 132 is connected to second gear 124 at second surface 128 via a first end 138 of second shaft 132. Rotational input is provided from second gear 124 to second shaft 132. Second shaft 132 can be connected at a second end 136 to a component of a drive train (not shown) or to another gear system (e.g., as shown in FIG. 2).

In some embodiments, a ratio of the number of teeth 104 at second surface 106 of first gear 102 to the number of teeth 130 at first surface 126 of second gear 124 is about 1:1. In some embodiments, a ratio of the sum of teeth of all planetary gears connected to carrier 112 to the number of teeth 130 at first surface 126 of second gear 124 is about 1:1. In some embodiments, a ratio of the sum of teeth of all planetary gears connected to carrier 112 to the number of teeth 104 at second surface 106 of first gear 102 is about 1:1. The gear ratio of gear system 100 is 1:1. The output torque is substantially equal to the input torque. The difference in rotational speed from input shaft 110 to output shaft 132 is double. For example, if first shaft 110 of gear system 100 is connected to a motor that produces 10 inch-pounds of torque at 500 RPM, the output of second shaft 132 of gear system 100 is 10 inch-pounds of torque at 1,000 RPM.

While first gear 102 is held static, gear system 100 provides second shaft 132 to rotate twice as fast as first shaft 110 with a reduced loss of torque. For example, if second end 136 of second shaft 132 is connected to a component of a drive shaft of an automobile, gear system 100 allows the drive shaft to spin twice as fast as the input (e.g., shaft 110). Such advantage is provided by the first gear which is static in combination with the second gear being double the speed of the input shaft while having a gear ratio of 1:1 (first gear to second gear). Accordingly, gear system 100 would allow the automobile to save twice the amount of gasoline, doubling the automobile's efficiency, as compared to an automobile without gear system 100 incorporated into the drive train. Such benefits are multiplicative in systems utilizing multiple gear systems (e.g., as shown in FIG. 2).

In addition, because first shaft 110 and second shaft 132 are utilized, gear system 100 utilizes less material and takes up less space, as compared to conventional gear systems.

In addition, first shaft 110 and/or second shaft 132 can optionally be hollow, reducing weight and the amount of material used. First shaft 110 and/or second shaft 132 that are hollow can be optionally used to provide fluid flow through the first shaft 110 and/or second shaft 132.

In alternative embodiments, second shaft 132 is used as an input shaft to gear system 100, and first shaft 110 is used as an output shaft of gear system 100. In such embodiments, rotational speed of output shaft (first shaft) 110 is half the rotational speed of input shaft (second shaft) 132.

Systems of the present disclosure can have any suitable number of gear systems. In some embodiments, a system has one gear system, two gear systems, three gear systems, four gear systems, five gear systems, six gears systems, seven gear systems, eight gear systems, nine gear systems, ten gears systems, or more. Multiple gear systems can be connected to one another via a shaft plus planetary gears, such as the configuration shown in FIG. 1 of gear system 100. FIG. 2 is a side view of a system 200 having a plurality of gear systems. System 200 has a first gear system 100, a second gear system 210, and a third gear system 212. First gear system 100 is gear system 100 of FIG. 1. First gear system 100 has first shaft 110 disposed through an orifice of first gear 102 and is connected to carrier 112. Planetary gears 118a-118e have teeth that are configured to engage with each of first gear 102 and second gear 124. First gear 102 is connected to a housing via a bracket 134. Second gear 124 is connected to second shaft 132 at a side opposite the side of second gear 124 that engages with the teeth of planetary gears 118a-118e.

Second shaft 132 provides rotational input to second gear system 210. Second gear system 210 has the second shaft 132 disposed through an orifice of third gear 202 and is connected to second carrier 214 via the second shaft 132. Planetary gears 222a-222e have teeth that are configured to engage with each of third gear 202 and fourth gear 224. Third gear 202 is connected to a housing (not shown) via a second bracket 234. Fourth gear 224 is connected to third shaft 232 at a side opposite the side of fourth gear 224 that engages with the teeth of planetary gears 222a-222e. Rotational input is provided from fourth gear 224 to third shaft 232.

Third shaft 232 provides rotational input to third gear system 212. Third gear system 212 has the third shaft 232 disposed through an orifice of fifth gear 204 and is connected to third carrier 216. Planetary gears 226a-226e have teeth that are configured to engage with each of fifth gear 204 and sixth gear 228. Fifth gear 204 is connected to a housing (not shown) via a third bracket 236. Sixth gear 228 is connected to fourth shaft 238 at a side opposite the side of sixth gear 228 that engages with the teeth of planetary gears 226a-226e.

Rotational input is provided from sixth gear 228 to fourth shaft 238 at a first end 240 of fourth shaft 238. Fourth shaft 238 can be connected at a second end 242 to a component of a drive train (not shown) or to another gear system (not shown).

While gears 102, 202, and 204 are held static, gear system 100 provides second shaft 132 to rotate twice as fast as first shaft 110 with reduced loss of torque, as compared to conventional gear systems. In addition, because second shaft 132 (now rotating twice as fast as first shaft 110) provides rotational input to second gear system 210, second gear system 210 provides third shaft 232 to rotate twice as fast as second shaft 132 and four times as fast as first shaft 110. Likewise, because third shaft 232 (now rotating four times as fast as first shaft 110) provides rotational input to third gear system 212, third gear system 212 provides fourth shaft 238 to rotate twice as fast as third shaft 232 and eight times as fast as first shaft 110.

For example, if second end 242 of fourth shaft 238 is connected to a drive shaft of a drive train of an automobile, third gear system 212 allows the drive shaft to spin eight times as fast as the input speed of the input shaft (e.g., first shaft 110).

Figure 3:
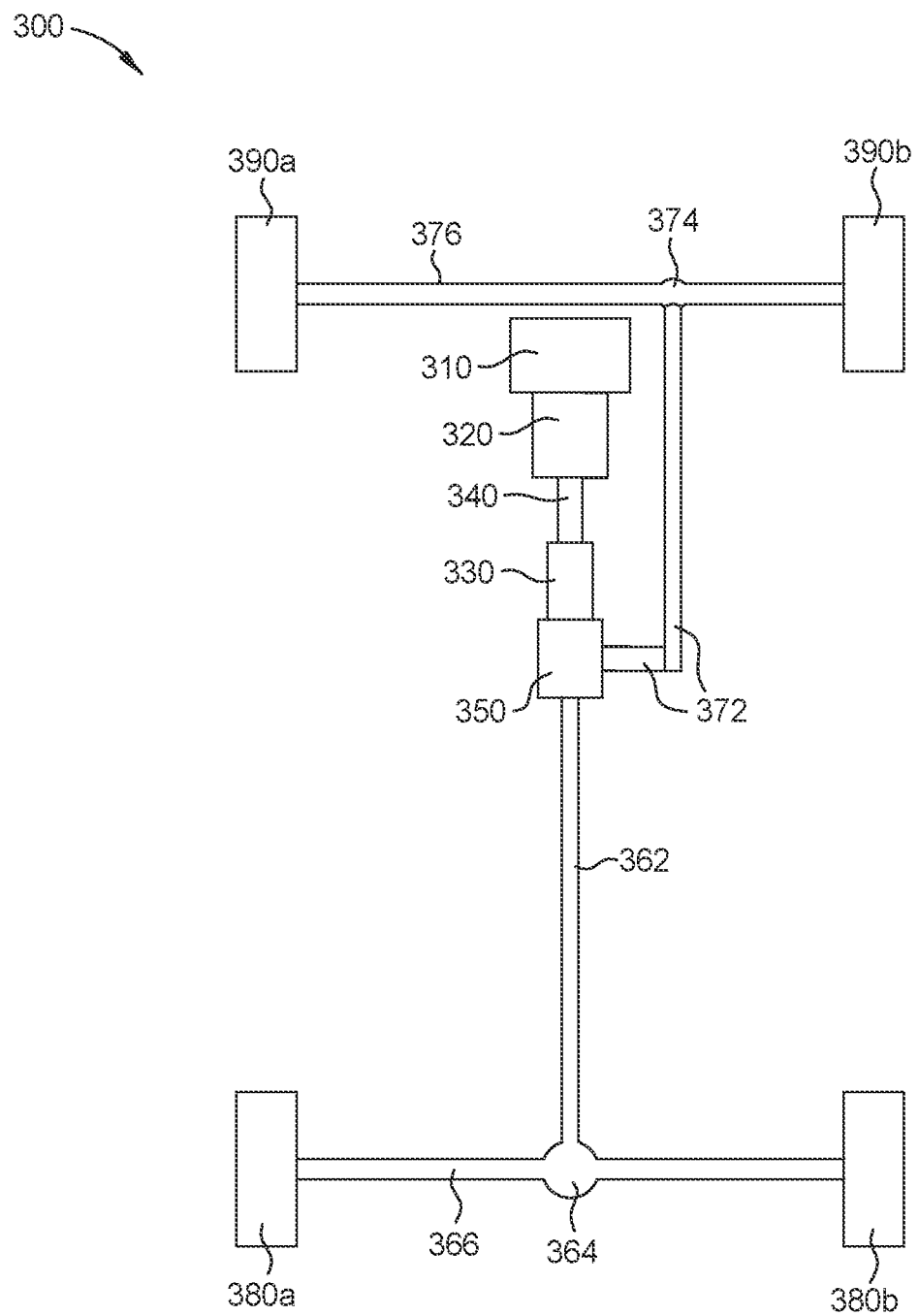
FIG. 3 is a schematic representation of a four wheel drive vehicle.

FIG. 3 is a schematic representation of a four wheel drive vehicle 300. Vehicle 300 has a power source 310, a transmission 320, a system 330 (containing a gear system of the present disclosure), an input shaft 340, a transfer case 350, a primary drive shaft 360, a secondary drive shaft 370, a pair of rear wheels 380a and 380b, and a pair of front wheels 390a and 390b. The power source 310 can be an internal combustion engine or battery powered motor, however, one skilled in the art will recognize that other sources of power may be used. The transmission 320 is connected with the power source 310 and, through a series of gearing mechanisms, transfers rotation to the input shaft 340. The transmission 320 may be either a manual or automatic transmission. System 350 can be or include gear system 100 of FIG. 1 or system 200 of FIG. 2. Input shaft 340 can be first shaft 110 of FIG. 1 or FIG. 2.

The input shaft 340 transmits the rotational output directly to transfer case 350 which transmits the rotational output directly to the primary drive shaft 360 and optionally to the secondary drive shaft 370. As shown in FIG. 3, the primary drive shaft 360 provides power to the rear wheels 380a, 380b of the vehicle and the secondary drive shaft 370 provides power to the front wheels 390a, 390b of the vehicle. Vehicle 300 is a primary rear wheel drive vehicle and a secondary front wheel drive vehicle. However, one skilled in the art will recognize that this embodiment is only one possible configuration and that a vehicle may be configured such that the primary drive train provides power to the front wheels and the secondary drive train provides power to the rear wheels.

ADDITIONAL ASPECTS

The present disclosure provides, among others, the following aspects, each of which may be considered as optionally including any alternate aspects.

Clause 1. A gear system, comprising:
a first shaft disposed through an orifice of a first gear, the first gear having a first surface and a second surface disposed opposite the first surface, the second surface having a plurality of teeth;
a second gear having a first surface and a second surface disposed opposite the first surface, the first surface having a plurality of teeth;
a carrier having a first surface and a second surface, the carrier connected to the first shaft at the first surface of the carrier;
a plurality of planetary gears connected to the carrier, the planetary gears each comprising a plurality of teeth configured to engage with the plurality of teeth of the second surface of the first gear and the plurality of teeth of the first surface of the second gear, the carrier and the plurality of planetary gears each disposed between the first gear and the second gear;
a bracket having a first end and a second end, the bracket connected to the first gear at the first end of the bracket; and
a second shaft having a first end and second end, the second shaft connected at the first end of the second shaft to the second gear at the second surface of the second gear.

Clause 2. The gear system of Clause 1, wherein the first shaft is not connected to the first gear.

Clause 3. The gear system of Clauses 1 or 2, wherein the planetary gears are connected to the carrier via a plurality of fasteners, each fastener having a length traversing a length of its respective planetary gear and disposed into the carrier at an angle substantially perpendicular to a height of the carrier.

Clause 4. The gear system of any of Clauses 1 to 3, wherein the stationary housing is a component of an automobile.

Clause 5. The gear system of any of Clauses 1 to 4, wherein the carrier is not directly connected to the second gear.

Clause 6. The gear system of any of Clauses 1 to 5, wherein the plurality of planetary gears is the sole source of indirect contact between the carrier and the second gear.

Clause 7. The gear system of any of Clauses 1 to 6, wherein the first gear has an outer surface corresponding to an outer diameter of the first gear and the outer surface is free of teeth.

Clause 8. The gear system of any of Clauses 1 to 7, wherein the second gear has an outer surface corresponding to an outer diameter of the second gear and the outer surface is free of teeth.

Clause 9. The gear system of any of Clauses 1 to 8, wherein a ratio of a total number of the teeth at the second surface of the first gear to a total number of the teeth at the first surface of the second gear is about 1:1.

Clause 10. The gear system of any of Clauses 1 to 9, wherein a ratio of a sum of the teeth of the planetary gears to a total number of the teeth at the first surface of the second gear is about 1:1.

Clause 11. The gear system of any of Clauses 1 to 10, wherein a ratio of the sum of the teeth of the planetary gears to a total number of the teeth at the second surface of the first gear is about 1:1.

Clause 12. A drive shaft connected to the gear system of any of Clauses 1 to 11, wherein the second shaft is connected to the drive shaft at the second end of the second shaft.

Clause 13. The gear system of any of Clauses 1 to 12, wherein the second shaft is connected to a second gear system at the second end of the second shaft.

Clause 14. The gear system of any of Clauses 1 to 13, wherein the second gear system comprises:

a third gear having a first surface and second surface disposed opposite the first surface, the second surface having a plurality of teeth, wherein the second shaft is disposed through an orifice of the third gear;

a fourth gear having a first surface and a second surface disposed opposite the first surface, the first surface having a plurality of teeth;

a second carrier having a first surface and a second surface, the carrier connected to the second shaft at the first surface of the carrier;

a second plurality of planetary gears connected to the second carrier, the planetary gears of the second plurality of planetary gears each comprising a plurality of teeth configured to engage with the plurality of teeth of the second surface of the third gear and the plurality of teeth of the first surface of the fourth gear, the second carrier and the second plurality of planetary gears each disposed between the third gear and the fourth gear;

a second bracket having a first end and a second end, the second bracket connected to the third gear at the first end of the second bracket and connected to the stationary housing or a second stationary housing at the second end of the second bracket; and a third shaft having a first end and second end, the third shaft connected at the first end of the third shaft to the fourth gear at the second surface of the fourth gear.

Clause 15. A housing comprising the gear system of any of Clauses 1 to 14, wherein the bracket is connected to the stationary housing at the second end of the bracket.

Overall, gear systems of the present disclosure provide increased output speed of a motor with reduced loss of torque. It has been discovered that gear systems of the present disclosure can provide rotational speed of an output shaft of the gear systems to be twice the rotational speed of an input shaft of the gear systems with reduced loss or torque. Gear systems also provide smaller gear systems as compared to conventional gear systems.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All numerical values within the detailed description herein are modified by "about" the indicated value, and take into account experimental error and variations that would be expected by a person having ordinary skill in the art.

All documents described herein are incorporated by reference herein, including any priority documents and or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise, whenever a composition, an element or a group of elements is preceded with the transitional phrase "comprising," it is understood that we also contemplate the same composition or group of elements with transitional phrases "consisting essentially of" "consisting of," "selected from the group consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

I claim:

1. A gear system, comprising:

a first shaft disposed through an orifice of a first gear, the first gear having a first surface and a second surface disposed opposite the first surface, the second surface having a plurality of teeth;

a second gear having a first surface and a second surface disposed opposite the first surface, the first surface having a plurality of teeth, wherein a ratio of a total number of the teeth at the second surface of the first gear to a total number of the teeth at the first surface of the second gear is about 1:1;

a carrier having a first surface and a second surface, the carrier connected to the first shaft at the first surface of the carrier;

a plurality of planetary gears connected to the carrier, the planetary gears each comprising a plurality of teeth configured to engage with the plurality of teeth of the second surface of the first gear and the plurality of teeth of the first surface of the second gear, the carrier and the plurality of planetary gears each disposed between the first gear and the second gear;

a bracket having a first end and a second end, the bracket connected to the first gear at the first end of the bracket; and a second shaft having a first end and second end, the second shaft connected at the first end of the second shaft to the second gear at the second surface of the second gear.

2. The gear system of claim 1, wherein the first shaft is not connected to the first gear.

3. The gear system of claim 1, wherein the planetary gears are connected to the carrier via a plurality of fasteners, each fastener having a length traversing a length of its respective planetary gear and disposed into the carrier at an angle substantially perpendicular to a height of the carrier.

4. The gear system of claim 1, wherein the bracket is connected to a component of an automobile at the second end of the bracket.

5. The gear system of claim 1, wherein the carrier is not directly connected to the second gear.

6. The gear system of claim 1, wherein the plurality of planetary gears is the sole source of indirect contact between the carrier and the second gear.

7. The gear system of claim 1, wherein the first gear has an outer surface corresponding to an outer diameter of the first gear and the outer surface is free of teeth.

8. The gear system of claim 7, wherein the second gear has an outer surface corresponding to an outer diameter of the second gear and the outer surface is free of teeth.

9. A gear system, comprising:
a first shaft disposed through an orifice of a first gear, the first gear having a first surface and a second surface disposed opposite the first surface, the second surface having a plurality of teeth;
a second gear having a first surface and a second surface disposed opposite the first surface, the first surface having a plurality of teeth;
a carrier having a first surface and a second surface, the carrier connected to the first shaft at the first surface of the carrier;
a plurality of planetary gears connected to the carrier, the planetary gears each comprising a plurality of teeth configured to engage with the plurality of teeth of the second surface of the first gear and the plurality of teeth of the first surface of the second gear, the carrier and the plurality of planetary gears each disposed between the first gear and the second gear, wherein a ratio of a sum of the teeth of the planetary gears to a total number of the teeth at the first surface of the second gear is about 1:1;
a bracket having a first end and a second end, the bracket connected to the first gear at the first end of the bracket; and
a second shaft having a first end and second end, the second shaft connected at the first end of the second shaft to the second gear at the second surface of the second gear.

10. The gear system of claim 9, wherein a ratio of the sum of the teeth of the planetary gears to a total number of the teeth at the second surface of the first gear is about 1:1.

11. A drive shaft connected to the gear system of claim 1, wherein the second shaft is connected to a drive shaft at the second end of the second shaft.

12. The gear system of claim 1, wherein the second shaft is connected to a second gear system at the second end of the second shaft.

13. The gear system of claim 12, wherein the second gear system comprises:

a third gear having a first surface and second surface disposed opposite the first surface, the second surface having a plurality of teeth, wherein the second shaft is disposed through an orifice of the third gear;
a fourth gear having a first surface and a second surface disposed opposite the first surface, the first surface having a plurality of teeth;
a second carrier having a first surface and a second surface, the carrier connected to the second shaft at the first surface of the carrier;
a second plurality of planetary gears connected to the second carrier, the planetary gears of the second plurality of planetary gears each comprising a plurality of teeth configured to engage with the plurality of teeth of the second surface of the third gear and the plurality of teeth of the first surface of the fourth gear, the second carrier and the second plurality of planetary gears each disposed between the third gear and the fourth gear;
a second bracket having a first end and a second end, the second bracket connected to the third gear at the first end of the second bracket and connected to the stationary housing or a second stationary housing at the second end of the second bracket; and
a third shaft having a first end and second end, the third shaft connected at the first end of the third shaft to the fourth gear at the second surface of the fourth gear.

14. A housing comprising the gear system of claim 1, wherein the bracket is connected to a stationary housing at the second end of the bracket.

15. A gear system, comprising:
a first shaft disposed through an orifice of a first gear, the first gear having a first surface and a second surface disposed opposite the first surface, the second surface having a plurality of teeth;
a second gear having a first surface and a second surface disposed opposite the first surface, the first surface having a plurality of teeth;
a carrier having a first surface and a second surface, the carrier connected to the first shaft at the first surface of the carrier;
a plurality of planetary gears connected to the carrier, the planetary gears each comprising a plurality of teeth configured to engage with the plurality of teeth of the second surface of the first gear and the plurality of teeth of the first surface of the second gear, the carrier and the plurality of planetary gears each disposed between the first gear and the second gear, wherein a ratio of the sum of the teeth of the planetary gears to a total number of the teeth at the second surface of the first gear is about 1:1;
a bracket having a first end and a second end, the bracket connected to the first gear at the first end of the bracket; and
a second shaft having a first end and second end, the second shaft connected at the first end of the second shaft to the second gear at the second surface of the second gear.

16. A drive shaft connected to the gear system of claim 15, wherein the second shaft is connected to a drive shaft at the second end of the second shaft.

17. The gear system of claim 15, wherein the second shaft is connected to a second gear system at the second end of the second shaft.

18. The gear system of claim 17, wherein the second gear system comprises:
a third gear having a first surface and second surface disposed opposite the first surface, the second surface having a plurality of teeth, wherein the second shaft is disposed through an orifice of the third gear;

a fourth gear having a first surface and a second surface disposed opposite the first surface, the first surface having a plurality of teeth;

a second carrier having a first surface and a second surface, the carrier connected to the second shaft at the first surface of the carrier;

a second plurality of planetary gears connected to the second carrier, the planetary gears of the second plurality of planetary gears each comprising a plurality of teeth configured to engage with the plurality of teeth of the second surface of the third gear and the plurality of teeth of the first surface of the fourth gear, the second carrier and the second plurality of planetary gears each disposed between the third gear and the fourth gear;

a second bracket having a first end and a second end, the second bracket connected to the third gear at the first end of the second bracket and connected to the stationary housing or a second stationary housing at the second end of the second bracket; and a third shaft having a first end and second end, the third shaft connected at the first end of the third shaft to the fourth gear at the second surface of the fourth gear.

19. A housing comprising the gear system of claim 15, wherein the bracket is connected to a stationary housing at the second end of the bracket.

* * * * *